US007962387B1

(12) United States Patent
Wahlberg et al.

(10) Patent No.: US 7,962,387 B1
(45) Date of Patent: Jun. 14, 2011

(54) SYSTEM AND METHOD FOR ADMINISTERING A FEE STRUCTURE FOR MUTUAL FUND SHARES

(75) Inventors: Linda Marie Sobolewski Wahlberg, St. Paul, MN (US); Derek Lyle Farmer, Arden Hills, MN (US); Kristine Marie Hahn Henderson, Edina, MN (US); Kent Michael Bergene, Fridley, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 678 days.

(21) Appl. No.: 11/847,874

(22) Filed: Aug. 30, 2007

Related U.S. Application Data

(60) Provisional application No. 60/824,722, filed on Sep. 6, 2006.

(51) Int. Cl.
*G06Q 40/00* (2006.01)
(52) U.S. Cl. ........................................ 705/35; 705/36 R
(58) Field of Classification Search .................... 705/35
See application file for complete search history.

(56) References Cited

U.S. PATENT DOCUMENTS

| | | | |
|---|---|---|---|
| 7,444,300 B1 * | 10/2008 | Broms et al. .................... | 705/35 |
| 7,496,531 B1 * | 2/2009 | Gastineau et al. ............. | 705/35 |
| 7,634,435 B2 * | 12/2009 | Davidovitch et al. .......... | 705/35 |
| 2002/0194098 A1 * | 12/2002 | Stiff et al. ....................... | 705/36 |
| 2002/0198801 A1 * | 12/2002 | Dixon et al. .................... | 705/35 |
| 2003/0018557 A1 * | 1/2003 | Gilbert et al. .................. | 705/36 |
| 2003/0130923 A1 * | 7/2003 | Charnley, Jr. .................. | 705/36 |
| 2004/0024677 A1 * | 2/2004 | Wallman ......................... | 705/36 |
| 2004/0034585 A1 * | 2/2004 | Saunders ........................ | 705/35 |
| 2004/0177022 A1 * | 9/2004 | Williams et al. ............... | 705/36 |
| 2005/0038726 A1 * | 2/2005 | Salomon et al. ............... | 705/36 |
| 2005/0187857 A1 * | 8/2005 | Tull, Jr. .......................... | 705/37 |
| 2006/0064313 A1 * | 3/2006 | Steinbarth et al. ............. | 705/1 |
| 2006/0212376 A1 * | 9/2006 | Snyder et al. .................. | 705/35 |
| 2006/0271465 A1 * | 11/2006 | McNamar et al. ............. | 705/35 |
| 2006/0277124 A1 * | 12/2006 | Gerrietts, II ................... | 705/35 |
| 2006/0293985 A1 * | 12/2006 | Lederman et al. ............. | 705/35 |
| 2008/0077519 A1 * | 3/2008 | Pedersen et al. ............ | 705/36 R |
| 2008/0147464 A1 * | 6/2008 | Sauter et al. .................... | 705/7 |

\* cited by examiner

*Primary Examiner* — Kirsten S Apple
(74) *Attorney, Agent, or Firm* — Snell & Wilmer L.L.P.

(57) ABSTRACT

A system and method for administrating a fee structure for a fund class of shares is disclosed. The invention includes issuing shares in a newly created Q class within a mutual fund, providing a right of accumulation benefit having a discounted front end sales load for a larger of said total share investment, not charging a front end sales charge, converting a percentage of the purchased Q shares to A shares each year such that principal and dividends are withdrawn from the A class without a contingent deferred sales charge, charging a contingent deferred sales charge upon early redemption of the purchased shares which is based upon an amount of the redemption and declines each year, reinvesting dividends into the A shares at net asset value and compensating financial intermediaries similar to A shares.

29 Claims, 2 Drawing Sheets

SYSTEM AND METHOD FOR ADMINISTERING A FEE STRUCTURE FOR MUTUAL FUND SHARES

RELATED APPLICATIONS

This application claims priority to, and the benefit of, U.S. Provisional Ser. No. 60/824,722 filed on Sep. 6, 2006, which is hereby incorporated by reference.

FIELD OF INVENTION

The present invention generally relates to the financial administration of mutual fund shares, and more particularly, to a method and system for administering a fee structure for mutual fund shares.

BACKGROUND OF INVENTION

A mutual fund is an investment company that invests in a diversified portfolio of securities. Investors who buy shares of a mutual fund are its owners or shareholders. Their investments provide the money for a mutual fund to buy securities such as stocks and bonds. Funds must calculate the price of their shares every business day. Investors can sell some or all of their shares anytime and receive the current share price, which may be more or less than the price originally paid. The share price is the market value of all the fund's assets (primarily securities), minus liabilities (the net asset value or NAV), divided by the total number of shares outstanding. The NAV and share price change as the values of the underlying securities rise or fall, and as the fund changes its portfolio by buying new securities or selling existing ones.

All funds have fees and expenses that are paid by investors and shareholders. The charges or sales commissions paid to buy, sell or exchange shares of a fund ("shareholder fees"), plus the annual costs paid directly by the fund that are associated with operating the fund ("annual fund operating expenses"), will affect shareholders' return on their investment in a fund.

A common type of shareholder fee is the sales charge or "load", which may be paid to the financial intermediary involved in the transaction. These "loads" may take the form of charges when an investor buys shares ("front-end loads") or sells shares ("back-end loads" or contingent deferred sales charges). Funds may also be structured as "no-load" with no sales charge, which are intended for investors who make their own investment decisions, usually without the advice of a financial professional. Although no-load funds do not charge a fee to buy, sell, or exchange shares, they may have an annual distribution (12b-1) or service fee to compensate sales professionals for providing ongoing services.

Annual fund operating expenses reflect the normal costs of operating a fund. These fees include such things as management and administration fees, distribution (12b-1) fees and shareholder servicing fees, and other expenses. Rule 12b-1 fees authorize funds to pay for marketing and distribution expenses, such as compensating sales professionals, directly from a fund's assets.

Because investors have different needs, funds may offer different pricing arrangements in the form of "classes" of shares. Share classes represent ownership in the same fund but offer investors a choice in how to pay for the fund. For example, a fund may offer Class A, Class B, and Class C shares. A typical construction of this structure follows:

Class A shares: front-end load and no, or a low, 12b-1 fee.
Class B shares: no front-end load, but a back-end load if shares are sold before a certain number of years, and a higher 12b-1 fee. After a period of years, B shares convert to A shares.
Class C shares: a higher 12b-1 fee, and lower or no front-end or back-end loads. This class of shares typically will not convert to A shares.

Funds may offer additional classes. Class A shares are generally structured to include "Rights of Accumulation" or "ROA", which entitles investors to a discounted front-end sales load for larger investments, typically provided at set breakpoints. For example, a fund with a five percent (5%) front-end sales load may offer a breakpoint at $50,000, such that if an investor purchases more than $50,000 worth of fund shares s/he will pay a lower front-end sales load, perhaps four percent (4%). Class A share breakpoint schedules typically are structured such that investors who invest a significant sum, e.g., $1,000,000, will pay no (0%) front-end sales load. For investors paying a front-end sales load, the effect is that, initially, something less than their total investment in the fund is actually invested in the fund. For example, an investor purchasing $10,000 worth of shares in a fund with a five percent (5%) front-end sales load is actually investing only $9,500 in the fund (with the remaining $500 being paid to the financial advisor or broker). If after one year, the fund appreciates in value by 5%, the value of the shareholders investment, based on the $9,500 investment, is $9,975.

Class B shares were offered, in part, as a response to certain shareholders' desire for an investment option without a front-end load, where the investor would see the total value of their initial investment invested in shares of the fund. Instead of paying a front-end load, an investor in Class B shares paid higher ongoing annual fees, typically in the form of a higher distribution (12b-1) fee, and was assessed a back-end load if and when s/he sold their shares. Back-end loads were typically structured on a declining scale such that, after a period of years, the back-end load would be decreased to zero, and eventually the B shares would be converted to A shares. This conversion to A shares is beneficial to the shareholder because of the lower ongoing distribution (12b-1) fees. Class C shares were another attempt to satisfy the desire of investors not to pay, or to limit, the front-end sales load. Class C shares are therefore typically structured with a low front-end sales load or no front-end sales load, and a shorter term, low, back-end sales load; C shares also bear a higher ongoing distribution (12b-1) fee, and are not typically converted to A shares.

These alternative share classes have encountered their share of criticism. For example, although it may be appealing to an investor not to pay a front-end sales load, and therefore to invest in B shares, the investor may be better off in A shares because of ROA or lower ongoing 12b-1 fees. Some funds have responded to these criticisms by closing B shares to new investors or limiting how much an investor can invest in B shares. Class C shares have encountered similar criticisms insofar as C shares never convert to A shares, i.e., for as long as a shareholder owns C shares, s/he will pay higher annual fees.

For a financial intermediary recommending a fund, or for an investor purchasing a fund, determining which share class may be best is complicated by several factors including but not limited to issues such as how much the investor is investing, over what time horizon the investor will be investing, how much and in what structure commissions will paid to the financial advisor or broker, and other considerations.

While many other classes of mutual fund shares have been created, none have gained in popularity and the other classes are generally directed to specific and narrow investment purposes. Thus, a need exists for mutual fund shares that offer an alternative cost structure, yet overcomes the abovementioned criticisms.

SUMMARY OF THE INVENTION

The present invention addresses the disadvantages of the prior art systems by providing a system and method for administering a fee structure for a mutual fund class of shares. The class and associated shares that conform to the embodiments of the present invention will be referred to herein as Q shares. In general, Q shares have the characteristics of a back-end loaded mutual fund that defers payment of sales charges and immediately puts to work an investor's full investment. Unlike typical back-end loaded funds that do not convert to A shares for several years, Q shares will convert gradually to another share class to take advantage of that class' characteristics such as lower 12b-1 fees. An exemplary benefit of this conversion is that the amount of converted shares are available to the investor each period to withdraw, exchange, or otherwise dispose of without paying back-end sales loads. In an exemplary embodiment, Q shares are converted to A shares. Note in the exemplary embodiment, because of the link between Q shares and A shares, that a Q share investor also benefits from ROA breakpoints. Additionally, compensation to financial intermediaries is designed to be equivalent to the sale of A shares, which mitigates potential conflicts of interest a financial intermediary may have in recommending one share class over another.

The system includes a processor and a database, wherein the database holds a purchase discount schedule, a conversion schedule, an expensing schedule, a sales charge schedule, a dividend schedule, an intermediary compensation schedule, and a short-term, low risk, low return, stable investment. In its exemplary embodiments, the system determines, accrues and tracks the amount of mutual fund shares purchased, sold, redeemed, and converted, and generates statements reflecting the various transactions performed. Furthermore, the system tracks the treatment of any dividends received from the mutual fund investments, and the sales charges (i.e., commissions) owed and paid to financial intermediaries.

An exemplary method for administering the fee structure for a mutual fund share comprises the steps of selling a mutual fund share, maintaining the share over a period of time, and redeeming the share from the mutual fund. As a result of the present invention, investors are able to invest in mutual funds while avoiding front-end sales loads, having the full amount of the initial purchase immediately put to work, and decreasing potential back-end sales loads as long as certain parameters are met.

The components of the system and method are configured in such a way as to provide an attractive mutual fund investment to both investors who purchase the fund and the financial intermediaries that recommend the fund. Exemplary benefits for financial intermediaries include avoiding the appearance of conflict of interest, while being uniformly incentivized, through sales compensation, to provide a suitable investment to potential investors.

DESCRIPTION OF FIGURES

A more complete understanding of the present invention may be derived by referring to the detailed description when considered in connection with the Figures, wherein like reference numbers refer to similar elements throughout the Figures, and.

DETAILED DESCRIPTION OF EXEMPLARY EMBODIMENTS

The detailed description of exemplary embodiments herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
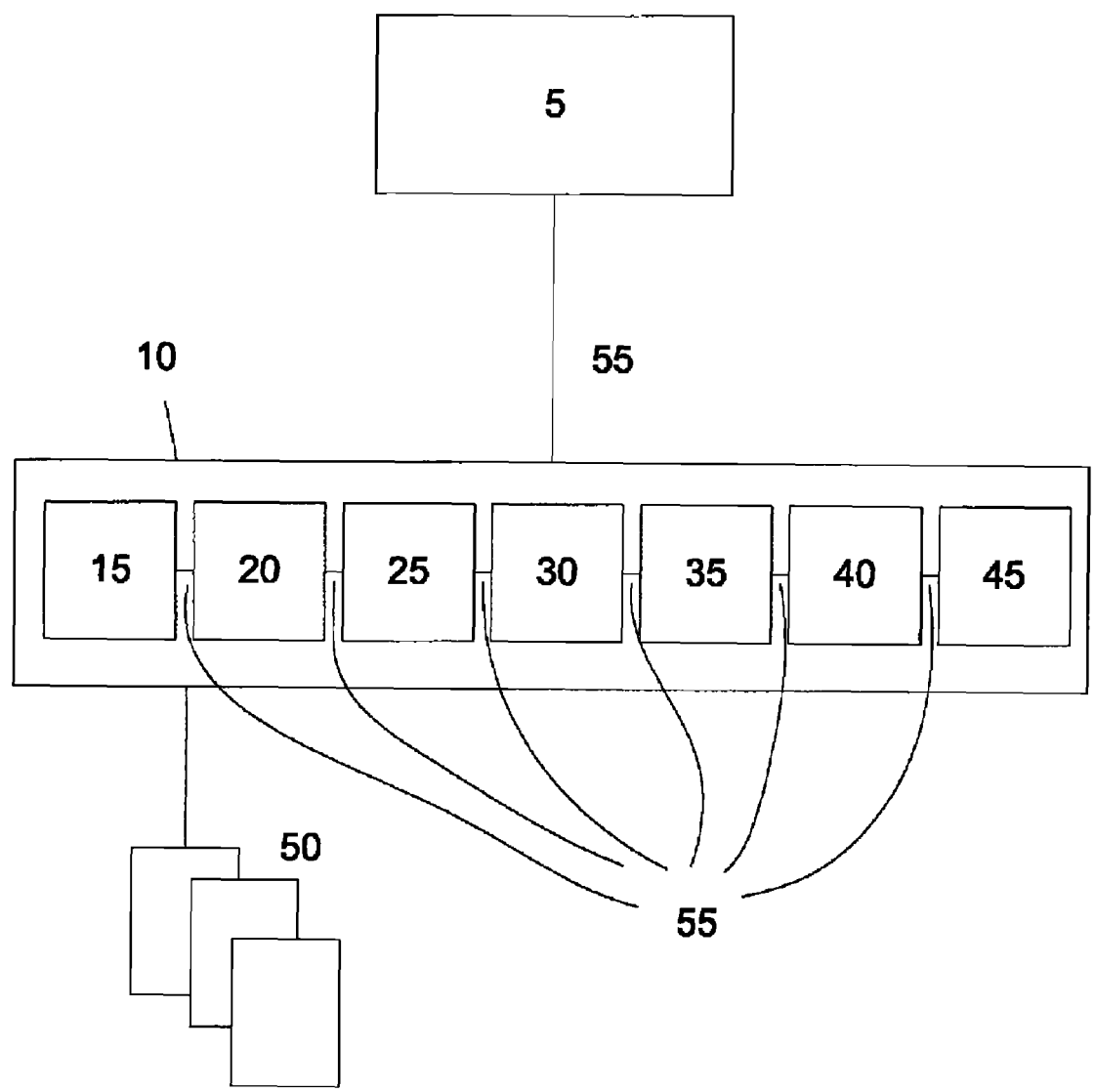
FIG. 1 is a block diagram of a system in accordance with an exemplary embodiment of the present invention; and, FIG. 2 is a block diagram of a method in accordance with an exemplary embodiment of the present invention.

In accordance with the present invention, and with reference to FIG. 1, a system for administering a fee structure for mutual fund shares comprises an engine 5 and database 10. An engine 5 comprises any suitable software (e.g., operating systems and applications), hardware (e.g., processors), and network components configured to transmit and receive data in accordance with the embodiments of the present invention. Database 10 stores a purchase discount schedule 15, a conversion schedule 20, an expensing schedule 25, a sales charge schedule 30, a dividend schedule 35, an intermediary compensation schedule 40, and a short-term, low risk, low return, stable investment 45. In its exemplary embodiments, the system also comprises an engine 5 and database 10 that are suitably configured to determine, accrue and track the amount of mutual fund shares purchased, sold, redeemed, and converted, and generate statements 50 reflecting the various transactions performed. Furthermore, the system comprises an engine 5 and database 10 that are suitably configured to track the treatment of any dividends received from the mutual fund investments, and the sales charges (i.e., commissions) owed and paid to financial intermediaries. In these exemplary embodiments, the various processors and databases communicate via a network 55. Data representing operation of the various schedules, client information, and fund information may be transmitted via network 55 between the various processors and databases, including computing elements external to the system.

Purchase Discount Schedule

In accordance with exemplary embodiments, a system for administering the fee structure for a mutual fund share has an engine 5 and database 10 suitably configured to hold and administer a purchase discount schedule 15, which is sometimes referred to as Rights of Accumulation (ROA). For example, in exemplary embodiments, a mutual fund purchaser is afforded a sales charge discount based on the amount invested in the mutual fund, or the mutual fund family, within a given period of time. As the amount invested by the purchaser from the specific mutual fund within a specific time period increases, the purchaser is granted greater discounts on the sales charge. In other embodiments, the investment amount needed to qualify for a discount may be aggregated across different share classes, mutual funds offered by the seller, on a household basis, or any other suitable grouping.

In accordance with exemplary embodiments, measurement of the groupings may include dollar amount, number of shares, or any other suitable measuring means that enables a mutual fund to offer discounts according to a purchase discount schedule. In one embodiment, the purchase discount schedule is grouped into bands of monetary value at time of purchase, sometimes referred to as ROA Bands.

Conversion Schedule

In accordance with exemplary embodiments, a system for administering the fee structure for a mutual fund share has an engine 5 and database 10 suitably configured to hold and administer a conversion schedule 20 in which shares purchased are converted to a different share class over a specific time period. In some embodiments, the conversion schedule 20 enables a purchaser to take advantage of the characteristics of a different share class (e.g., A shares), while not incurring penalties or increased sales charges on unconverted shares. For example, once a conversion is performed, the purchaser is able to withdraw a portion of the mutual fund investment in the form of A shares, avoiding any front-end loads or back-end loads on the converted shares.

In certain embodiments, the conversion schedule 20 may have multiple parameters such as percentage converted, type of mutual fund offered, and when the conversion is performed. For example, the conversion schedule 20 is partially determined by the ROA Band into which a given purchase falls. In this schedule, the amount of shares eligible for conversion increase as the amount of the initial share purchase increases. Additionally, the conversion schedule 20 is partially determined by the type of mutual fund. For example, if the shares are offered from an equity mutual fund, the conversion schedule 20 may range from 5-100%. In another embodiment in which the shares are offered from a fixed income mutual fund, the conversion schedule 20 may range from 10-100%. Furthermore, conversions performed according to the conversion schedule may occur on a monthly basis. However, any time period, such as quarterly, semi-annually, or annually, in which to perform a conversion, is suitable. In exemplary embodiments, the shares may be converted on a FIFO, LIFO, or pro-rata basis; however, any conversion order may be suitable.

Expensing Schedule

In accordance with exemplary embodiments, a system for administering the fee structure for a mutual fund share has an engine 5 and database 10 suitably configured to hold and administer an expensing schedule 25 that assesses the expenses of the mutual fund to owners of the various shares of the mutual fund. In accordance with exemplary embodiments, the expenses are charged yearly. However, any time period to charge the expenses to the shares is suitable. Typically, the expensing schedule 25 for the Q shares will be higher, when compared with the expensing schedule common to an A share of the same mutual fund. However, the difference in the annualized return between a Q share purchase and an A share purchase over a period of time will be negligible because of the conversion schedule 20 described above. As such, the benefit of the present invention is an expensing schedule 25 that in conjunction with the sales charge schedule actuarially approximates the expensing and sales charge schedules of other common shares classes, without incorporating those share classes' disadvantages.

Sales Charge Schedule

In accordance with exemplary embodiments, a system for administering the fee structure for a mutual fund share has an engine 5 and database 10 suitably configured to hold and administer a sales charge schedule 30 representing the deferred sales charge owed by the purchaser. For the sales services of financial intermediaries, the mutual fund company typically pays a commission. These commissions are generally paid by the investor as a sales charge. As described above, one of the perceived disadvantages of the A share class is that the commission is paid upfront by the investor. In response, B and C shares were created to assess the commissions to the investor in a deferred manner. However, the mutual fund company typically will still pay a commission on B class share at time of purchase, or on an ongoing basis, in the case of C shares. So, while a sales charge may be owed to the intermediary, it may not be immediately collected by the mutual fund company from the investor. Because of how previous share classes or sales charges have been administered, an intermediary's compensation may be higher for a particular share class than other classes in the same fund. As a result, financial intermediaries may have appeared to have a conflict of interest when recommending particular classes of shares.

In response to this disadvantage, and in accordance with exemplary embodiments, a system for administering the fee structure for a mutual fund share has an engine 5 and database 10 suitably configured to hold and administer a sales charge schedule 30 that applies to the sale and redemption of an investor's shares. As a result, in some embodiments, the intermediary compensation resulting from the sales charge schedule in conjunction with the expense schedule actuarially approximates a sales charge schedule and intermediary compensation for A shares of the same mutual fund, as long as certain parameters are met. This sales charge schedule 30 enables a mutual fund company to collect charges and compensate a financial intermediary for the sale of the Q shares equally vs. A shares. In turn, this enables a financial intermediary to offer a purchaser the Q shares without a conflict of interest, because s/he is being compensated an equivalent amount to the A share. In accordance with exemplary embodiments, the sales charge schedule is only applied to a purchaser's unconverted shares. Furthermore, in accordance with exemplary embodiments, the sales charge schedule charges a range of percentages of the value or amount of unconverted shares that are redeemed or sold providing flexibility in application.

In some embodiments, the sales charge schedule 30 includes multiple parameters such as, for example, value or amount of initial purchase or total amount currently invested in the fund family, type of mutual fund offered, and when the Q shares are redeemed or sold. For example, the sales charge schedule 30 is partially determined by ROA Band into which a given initial purchase falls. In this sales charge schedule, the percentage may range from 6% for initial purchases which fall in a lower ROA band to 1%, or even zero, when the initial purchase is sufficiently large and in the top ROA band. In other words, the more that is initially purchased by an investor, the less the sales charge will be if the Q shares are redeemed or sold before they are converted. Additionally, the sales charge schedule 30 is partially determined by the type of mutual fund. For example, in one embodiment, if the Q shares are offered from an equity mutual fund, the sales charge schedule may range from 6% down to 1%. In another embodiment in which the Q shares are offered from a fixed income mutual fund, the sales charge schedule may range from 5% down to 1%.

Moreover, in accordance with exemplary embodiments, the sales charge schedule 30 is partially determined by the length of time from initial purchase to redemption, or sale, of a particular unconverted Q share. For example, if in Year 1 a purchaser chooses to sell shares, the sales charge for a certain ROA band upon sale is 5.75%. However, if that same purchaser holds the same share until Year 5, the sales charge is 3.85%. The sales charge decreases as the holding period increases, so that in Year 10 or 11, the sales charge may be 0.6% or 0%, respectively.

Dividend Schedule

In accordance with exemplary embodiments, a system for administering the fee structure for a mutual fund share has an engine 5 and database 10 suitably configured to hold and administer a dividend schedule 35 that tracks dividends received by a Q share. In some embodiments, the dividends may be withdrawn as cash, or reinvested into a different share class. For example, if reinvested, the dividend may be reinvested to purchase an A share of the same mutual fund without the front-end load, and may be withdrawn without payment of a back-end load. In accordance with exemplary embodiments, all dividends paid, whether out in cash or reinvested, will reduce the number of shares converted according to the conversion schedule 20 described above.

Intermediary Compensation Schedule

In accordance with exemplary embodiments, a system for administering the fee structure for a mutual fund share has an engine 5 and database 10 suitably configured to hold and administer an intermediary compensation schedule 40 comprising commission rates for sales of a Q share. In its exemplary embodiments, the intermediary compensation schedule 40 is equivalent to compensation schedules for A shares. This equivalence creates a situation whereby financial intermediaries are indifferent to selling Q shares versus A shares. As such, due to the reduction in apparent conflict of interest coupled with selling a non-front-loaded fund, the present invention presents an improvement over other current share class constructions.

In accordance with exemplary embodiments, the compensation schedule comprises time of sale and trailing compensation rates. The time of sale compensation rate is equivalent to a different share class' time of sale compensation rate so as to create intermediary indifference between share classes. In one exemplary embodiment, this rate is equivalent to the rates used for A shares. The intermediary compensation based on Q shares and A shares for purchases of the same amount of shares should not be substantially different. In another embodiment, this difference is zero. Although a compensation schedule has been described using time of sale and trailing compensation rates, any rate structure which creates an actuarially equivalent compensation rate to another share class is suitable.

Stable Investment

In accordance with exemplary embodiments, a system and method for administering the fee structure for a mutual fund share has an engine 5 and database 10 suitably configured to administer exchanges of Q shares to and from a short-term, low risk, low return, stable investment 45, e.g. a money market fund. The purpose of this exchange mechanism is to provide an avenue for a purchaser to "get out of the market" and place their money into a relatively safe investment without redeeming mutual fund Q shares. Avoiding redemption or sale, which may trigger sales charges, penalties, disadvantageous treatment of dividends, rights of accumulation and the like, enables an investor to better manage the investment's return.

Movement of money into this stable investment 45 suspends the applicable time periods on various schedules that are described above. For example, shares moved into this stable investment will not participate in the conversion schedule 20 while in the stable investment. Additionally, the time period that a purchaser's money spends in the stable investment will be subtracted from (i.e., essentially not count towards) time-related schedules. This suspension of time may have the effect of "freezing" sales charges (i.e., back-end loads will not decrease with time spent in this stable investment) or not counting dividends based on these shares towards DCRA calculations (DCRA is described in a subsequent section). In one embodiment, the stable investment is a money market fund. However, any investment which offers a low risk, low return, safe haven from the market on a temporary basis is suitable.

Figure 2:
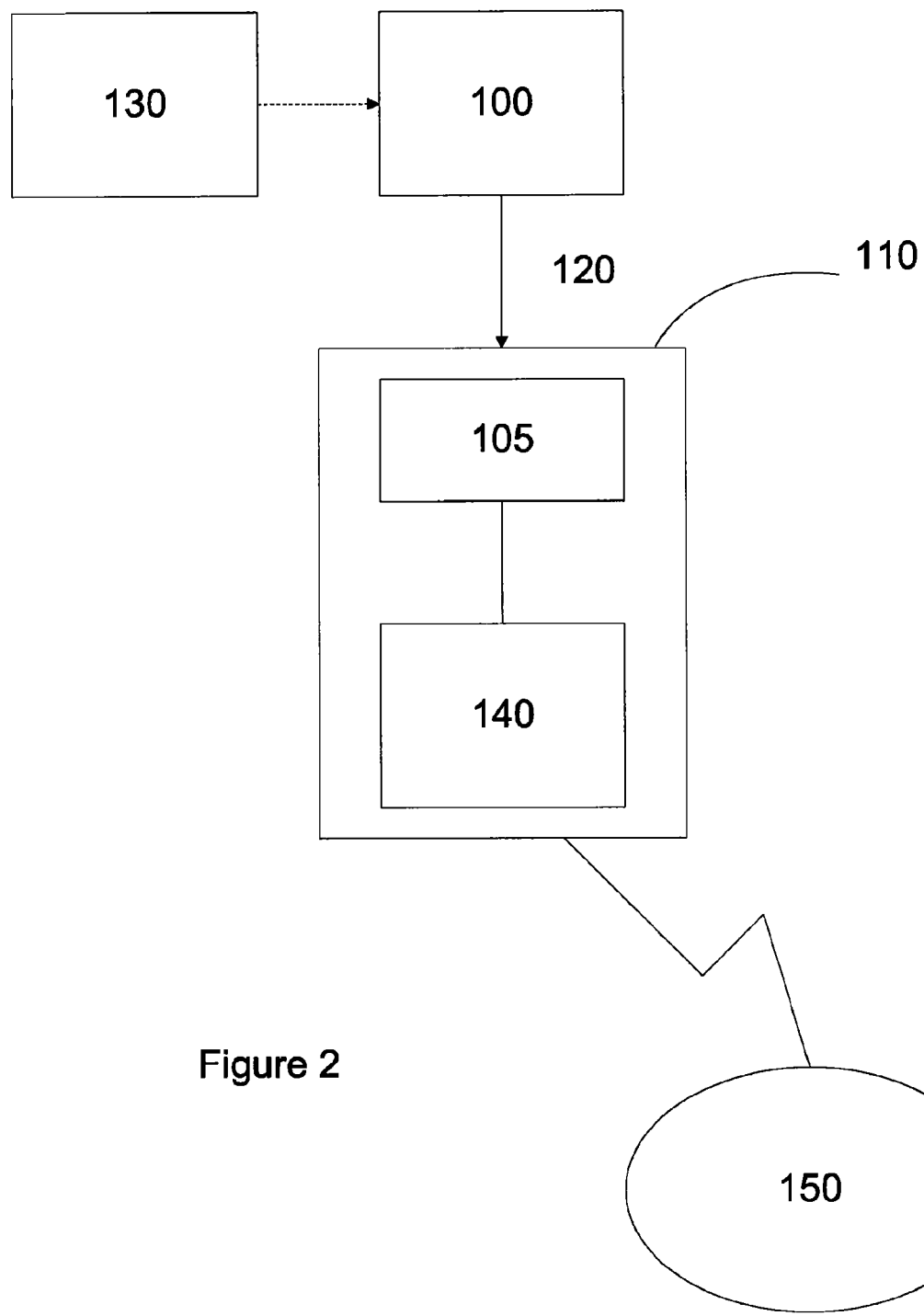

With reference to FIG. 2, an exemplary method for administering the fee structure for a mutual fund share comprises the general steps of selling a mutual fund share, maintaining the share in accordance with the present invention over a period of time, and withdrawing the share from the mutual fund.

Once an investor 100 decides to purchase a mutual fund share, recording system 110, which is comprised of an engine 105 and a database 140, is initialized with initial purchase characteristics. Purchase characteristics comprise data 120 that is transmitted to recording system 110, the data comprising the number of shares purchased, the date of purchase, the financial intermediary 130 that sold the share to investor, the commission owed to a financial intermediary, and other investor information, for example, name and address information. Each share is associated with (i.e., owned by) an investor 100. Once the purchase is confirmed, financial intermediary 130 is paid a commission according to intermediary compensation schedule contained in a database 140.

After the purchase of a mutual fund share, financial characteristics of the mutual fund share are maintained by recording system 110. Maintenance activities generally occur on a periodic basis, for example, yearly. However, any periodic time frame to perform maintenance activities is suitable. Although the maintenance activities will be described in a certain order below, it is understood that the any order of performing the maintenance activities is suitable.

Recording system 110 also maintains the NAV. In exemplary embodiments, the NAV is derived by querying external databases for the value of the underlying assets of the mutual fund. In another embodiment, the NAV may be calculated in a system 150 external to the recording system 110, in which case, recording system 110 queries the external system 150 for the NAV of the mutual fund. Alternatively, external sources may provide a data feed into recording system 110 of the prices of each of the underlying assets of the mutual fund. Regardless of the method of obtaining asset prices, recording system 110 records the NAV daily.

In accordance with exemplary embodiments, maintaining a share comprises deducting expenses from a share's value in accordance with an expensing schedule contained in database 140. In one embodiment, a software application associated with engine 105 and database 140 calculates the yearly mutual fund expenses and the expenses to be distributed to each share class of the mutual fund.

In accordance with exemplary embodiments, maintaining a share comprises transmitting data to an intermediary compensation schedule contained in database 140 that contains data representing ongoing compensation to the intermediary 130 that sold the investor the share of the mutual fund. In one embodiment, recording system 110 identifies the financial intermediary 130 responsible for selling the investor the share. As described above, the value of the share is obtained. Engine 105 calculates the compensation owed for the particular share to the financial intermediary 130 in accordance with the intermediary compensation schedule. In other embodiments, the total value of the shares sold to an investor 100 by a financial intermediary 130 is calculated. This total is used by the engine 105 to lookup the intermediary's compensation contained in an intermediary compensation schedule on a database 140. In most embodiments, the intermediary compensation does not affect the value of the shares. Though specific embodiments of ongoing compensation have been described, any ongoing intermediary compensation schedule and the specific manner in which it is maintained are contemplated by the present invention.

In accordance with exemplary embodiments, maintaining a share comprises tracking dividends earned by Q shares. Mutual funds determine net income and net capital gains earned, and then allocate these amounts appropriately to each share class. These amounts are then distributed to shareholders as a dividend, based on the number of shares owned. In accordance with exemplary embodiments, an investor 100 may have the choice to reinvest the dividends into the mutual fund (i.e., purchasing more shares), or receive the dividends as cash. Should the investor choose to reinvest the dividends, the dividends are used to purchase A shares of the mutual fund. In this instance, recording system 110 initiates a purchase of A shares of the mutual fund and records the number of shares purchased. In another embodiment, should the investor choose to receive the dividends as cash, recording system 110 transmits the amount of the dividend to a payment system and the funds are disbursed.

Regardless of the investor's choice of dividend treatment, recording system 110 tracks the total amount of dividends distributed to each investor through the Dividend Conversion Reduction Amount (DCRA). The DCRA is used to reduce the number of shares converted as explained below. In accordance with one embodiment, engine 105 queries recording system 110 for the cash paid out to investor. Engine 105 divides the cash paid out by the NAV and increments the DCRA by this number of shares. In the cases of shares that are withdrawn, exchanged, and/or transferred out, the DCRA is reduced on a pro-rata basis. In the case of transfers or exchanges within the Q share class, but between different types of funds, the DCRA of the transferred-into-fund is incremented by an amount with an equivalent value to the reduction of the DCRA in the transferred-out-of-fund. Although a specific embodiment has been described for the maintenance of dividends, any method which accounts for dividend treatment within a similar conversion process of the present invention is suitable.

In accordance with exemplary embodiments, maintaining a share comprises converting shares to a different share class according to a conversion schedule contained within database 140. In one embodiment, the Q shares are converted into A shares of the mutual fund. At the proper periodic time (e.g., monthly), engine 105 queries recording system 110 for all purchase information for a particular investor including the number of shares eligible for the conversion process. Recording system 110 returns the total value of the shares purchased within the period. Engine 105 queries the purchase discount schedule to obtain the ROA Band in which the purchase falls. Once the ROA Band is obtained, engine 105 queries a recording system for the type of mutual fund for which the shares were purchased (e.g., an equity fund or a fixed income fund). The result of the query is the conversion percentage for the shares. Engine 105 multiplies the conversion percentage by the number of shares to obtain the preliminary conversion shares (PCS). It is possible that the eligible shares for conversion were purchased at different times, in other words, in different share lots. In this instance, a PCS is calculated for each share lot and summed to obtain the Aggregate PCS (APCS). If only one lot is eligible, then PCS equals APCS. In some embodiments, a limit is set denoting the longest time period an investor has to hold a Q share before all shares in a particular share lot are eligible for conversion. For example, if an investor holds all shares for a period of ten years, all shares within this share lot will be eligible for conversion.

Continuing with this embodiment, once APCS is calculated, the recording system 110 looks up the DCRA contained in database 140. If the APCS is greater than the DCRA, then the Final Conversion Shares (FCS) will be calculated as APCS minus DCRA. Once this calculation is made, DCRA is reset to zero. If the DCRA is greater than APCS, the FCS is set to zero and the DCRA is decreased by the amount of APCS. Once these calculations are made, recording system 110 converts the amount of Q shares represented by FCS to A shares by decreasing the number of Q shares by FCS and increasing the value of the investor's A shares by the value of Q shares converted. Determining which specific shares in a lot to convert may be determined by using a FIFO (First-In-First-Out), LIFO (Last-In-First-Out), pro-rata, or any similar methods. Although the conversion process has been described with respect to conversion to A shares, any share class similar in characteristics may be suitable for Q shares to be converted to.

In accordance with exemplary embodiments, withdrawing a share comprises calculating a back-end load in accordance with a sales charge schedule contained in database 140. In general, upon purchase, an investor paid no front-end load to the mutual fund company or financial intermediary. Instead, the sales charge is deferred according to a sales charge schedule and paid upon withdrawal of shares from the fund, for example, Q shares that have not yet converted to A shares. In one embodiment, investor 100 decides to withdraw a number of shares from Q shares. Engine 105 queries recording system 110 for all purchase information for a particular investor including the date of purchase of each share lot (i.e., a number of shares purchased at the same time), and the number of shares converted into a different share class. Based on the purchase dates of each share lot, engine 105 queries the sales charge schedule to obtain the ROA Band in which each share lot's purchase falls. Once the ROA Band is obtained, engine 105 queries recording system 110 for the type of mutual fund from which the shares were purchased (e.g., an equity fund or a fixed income fund). Using the ROA Band, the type of mutual fund, and the period of time elapsed since the purchase date of the share lot, the sales charge is obtained. The sales charge may be represented as a percentage, or a pre-calculated dollar amount derived from various factors. In one embodiment, the sales charge is a range of percentages enabling flexibility in charging a particular investor due to other factors (e.g., strength of relationship, amount of money held with the company in other investments, etc.). However, in an embodiment where the sales charge schedule returns a sales percentage, the software application multiplies the sales charge percentage by the value of the shares to obtain the sales charge. The sales charge is then deducted from the funds distributed to the investor, or if an investor did not withdraw all shares from the mutual fund, the recording system decreases the number of shares owned by the investor by the amount of the sales charge. In some embodiments, a limit is set denoting the longest time period an investor has to hold a share of the present invention before all shares in a particular share lot are eligible for no sales charge. For example, if an investor holds all shares for a period of over ten years, all shares within this share lot will be eligible for no sales charge.

In accordance with exemplary embodiments, rather than an investor withdrawing a share completely from the mutual fund, the investor may choose to exchange or transfer the share into a short-term, low risk, low return, stable investment contained in database 140. In one embodiment, the stable investment is a money market fund. Upon exchange into the stable investment, the recording system records the date of the transfer and the dollar amount transferred. This date is used to "suspend" the aging of these particular assets (dollars). In this instance, the time period the assets spend in the stable investment is subtracted from the aging calculation, for example, and the time period associated with the sales charge schedule. Furthermore, the amount transferred into the stable investment may no longer eligible for conversion while in the stable investment. As such, the assets are not used in the conversion calculation. In exemplary embodiments, assets in this stable investment are not included in the compensation schedule. Although various conditions have been described with respect to exchanging shares into a stable investment, any condition and method of administering conditions that deviate from the normal maintenance of the present invention are intended to be included in the present invention.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing system including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; financial institution data; and/or like data useful in the operation of the system. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall have its ordinary meaning in addition to including any electronic communications means which incorporates both hardware and software components of such. Communication among the parties may be accomplished through any suitable communication channels, such as, for example, a telephone network, an extranet, an intranet, Internet, point of interaction device (point of sale device, personal digital assistant (e.g., Palm Pilot®, Blackberry®), cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" shall have its ordinary meaning including sending electronic data from one system component to another over a network connection. Additionally, as used herein, "data" may include encompassing information such as commands, queries, files, data for database, and the like in digital or any other form.

The system contemplates uses in association with web services, utility computing, pervasive and individualized computing, security and identity solutions, autonomic computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks.

Firewall may include any hardware and/or software suitably configured to protect components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based and Packet Filtering among others. Firewall may be integrated within a web server or any other components or may further reside as a separate entity.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, database, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, Macromedia Cold Fusion, Microsoft Active Server Pages, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable database medium having computer-readable program code means embodied in the database medium. Any suitable computer-readable database medium may be utilized, including hard disks, CD-ROM, optical database devices, magnetic database devices, and/or the like.

The system and method is described herein with reference to screen shots, block diagrams and flowchart illustrations of methods, apparatus (e.g., systems), and computer program products according to exemplary embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Finally, it should be understood that various principles of the invention have been described in illustrative embodiments. However, many combinations and modifications of the above-described components, used in the practice of the invention, in addition to those not specifically described, may be varied and particularly adapted to specific environments and operating requirements without departing from those principles. Other variations and modifications of the present invention will be apparent to those of ordinary skill in the art, and it is the intent that such variations and modifications be covered.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

We claim:

1. A computer-implemented method for administrating a fee structure for a fund class of shares, said method comprising:
    issuing, by a computer for said administrating said fee structure for said fund class of shares, first class shares to create a first class and second class shares to create a second class within a fund having securities which represent ownership in an entity;
    determining, by said computer, a total share investment for a first sale based upon a share price for a first lot of said first class shares, wherein said first lot is purchased for a client;
    investing, by said computer, said total share investment into at least a portion of said securities;
    determining, by said computer, a first sales compensation for said first sale based on a potential second sales compensation associated with a potential second sale, wherein said first sales compensation is actuarially equivalent to said potential second sales compensation, wherein said potential second sale is associated with said second class and said potential second sale is associated with a sale amount equal to the total share investment;
    converting, by said computer, a percentage of said first lot to said second class.

2. The method of claim 1, further comprising providing a right of accumulation benefit.

3. The method of claim 1, further comprising providing a right of accumulation benefit having a discounted front end sales load for a larger of said total share investment.

4. The method of claim 1, wherein said converting comprises converting a percentage of said first lot to said second class having lower administrative fees.

5. The method of claim 1, wherein said converting comprises converting a percentage of said purchased shares to said second class based on at least one of:
    right of accumulation level and type of fund.

6. The method of claim 1, wherein, for higher right of accumulation levels, said converting step comprises converting a larger percentage of said first lot to said second class.

7. The method of claim 1, wherein said converting comprises converting a percentage of said purchased shares to said second class, wherein said percentage within a right of accumulation level applies for a life of said purchased shares.

8. The method of claim 1, wherein converting step comprises converting all of said first lot to said second class within nine and a half years after said investing.

9. The method of claim 1, wherein said converting comprises converting a percentage of said first lot to said second class, wherein said second class includes A shares.

10. The method of claim 1, wherein said converting comprises converting a percentage of said purchased shares to said second class such that at least one of: principal and dividends are withdrawn from said second class without a contingent deferred sales charge.

11. The method of claim 1, further comprising
 obtaining, by said computer, purchase information associated with a first period and the client, wherein the first period is a period of time;
 determining, by said computer, a first period total shares based upon the purchase information; and,
 determining, by said computer, a first period total eligible shares based upon at least one of a total number of shares in a lot, a total number of shares, a total number shares in a fund, the total share investment, a investment by the client, a total investment by a family associated with the client and a duration, wherein the duration represents a period of time.

12. The method of claim 1, wherein said investing said total share investment into said securities comprises not using any of said total share investment for a front end sales charge.

13. The method of claim 1, further comprising charging a contingent deferred sales charge upon early redemption of said purchased shares.

14. The method of claim 1, further comprising charging a contingent deferred sales charge upon early redemption of said first lot, wherein said contingent deferred sales charge is based upon an amount of said redemption.

15. The method of claim 1, further comprising charging a contingent deferred sales charge upon early redemption of said first lot, wherein said contingent deferred sales charge declines each year.

16. The method of claim 1, further comprising, for higher right of accumulation levels, charging a lower contingent deferred sales charge upon early redemption of said first lot.

17. The method of claim 1, further comprising charging a contingent deferred sales charge upon early redemption of said purchased shares, wherein said contingent deferred sales charge within a right of accumulation level applies for a life of said first lot.

18. The method of claim 1, further comprising charging a contingent deferred sales charge upon early redemption of said first lot for retirement distributions.

19. The method of claim 1, further comprising charging a contingent deferred sales charge upon early redemption of any portion of said first lot.

20. The method of claim 1, further comprising charging a contingent deferred sales charge upon early redemption of said first lot, wherein said contingent deferred sales charge is based upon an amount associated with said redemption.

21. The method of claim 1, further comprising reinvesting dividends associated with said first lot into said second class.

22. The method of claim 21, further comprising reinvesting said dividends into said second class at net asset value.

23. The method of claim 1, further comprising reinvesting dividends into said second class and proportionately reducing said percentage of said purchase shares that are converted each year.

24. The method of claim 21, further comprising proportionately reducing said percentage of said first lot that are converted each year without reducing said percentage of said first lot at a final conversion event.

25. The method of claim 1, wherein the determining said first sales commission comprises determining a first sales compensation for said first sale based a potential second sales compensation associated with a potential second sale and based upon a conversion compensation associated with the converting, wherein the first sales compensation is actuarially equivalent to a potential second sales compensation, wherein said potential second sale is associated with said second class and said potential second sale is associated with a sale amount equal to the total share investment.

26. The method of claim 1, wherein said fund is at least one of a: mutual fund and money market fund.

27. The method of claim 1,
 wherein said issuing comprises accessing a mutual fund database having fields representing said shares, increasing a number of said shares in said database and associating a first pricing arrangement with said shares, wherein said pricing arrangement includes first rules for payment for said shares;
 wherein said receiving a share price comprises obtaining a market value of assets of said mutual fund from a securities database, obtaining liabilities of said mutual fund, reducing said market value by said liabilities of said mutual fund to obtain a result, and dividing said result by a number of said shares of said mutual fund that are outstanding;
 wherein said investing comprises accessing a securities database containing said securities, assigning ownership of at least a portion of said securities to an investor, tagging said at least a portion of said securities with an identifier of said investor, and storing said at least a portion of said securities in said database; and,
 wherein said converting comprises disassociating said first pricing arrangement from said first lot, and associating a second pricing arrangement with said first lot, wherein said second pricing arrangement includes second rules for payment for said first lot.

28. A computer based system for administrating a fee structure for a fund class of shares, comprising:
 a network interface communicating with a non-transitory memory;
 said memory communicating with a processor for said administrating said fee structure for said fund class of shares; and
 said processor, when executing a computer program, is configured to:
  issue first class shares to create a first class and second class shares to create a second class within a fund having securities which represent ownership in an entity;
  determine a total share investment for a first sale based upon a share price for a first lot of said first class shares, wherein said first lot purchased for a client;
  invest said total share investment into at least a portion of said securities;
  determine a first sales compensation for said first sale based on a potential second sales compensation associated with a potential second sale, wherein said first sales compensation is actuarially equivalent to said potential second sales compensation, wherein said potential second sale is associated with said second class and said potential second sale is associated with a sale amount equal to the total share investment; and convert a percentage of said first lot to said second class.

29. A non-transitory computer-readable medium having computer-executable instructions stored thereon that, if executed by a computer for administrating a fee structure for a fund class of shares, cause said computer to perform operations comprising:

issuing first class shares to create a first class and second class shares to create a second class within a fund having securities which represent ownership in an entity;

determining a total share investment for a first sale based upon a share price for a first lot of said first class shares, wherein said first lot purchased for a client;

investing said total share investment into at least a portion of said securities;

determining a first sales compensation for said first sale based on a potential second sales compensation associated with a potential second sale, wherein said first sales compensation is actuarially equivalent to said potential second sales compensation, wherein said potential second sale is associated with said second class and said potential second sale is associated with a sale amount equal to the total share investment; and converting a percentage of said first lot to said second class.

\* \* \* \* \*